US010119204B2

(12) United States Patent
Mantaux et al.

(10) Patent No.: US 10,119,204 B2
(45) Date of Patent: Nov. 6, 2018

(54) METHOD FOR UNWEAVING AND REALIGNING CARBON FIBERS

(71) Applicants: UNIVERSITÉ DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR)

(72) Inventors: Olivier Mantaux, Villenave-d'Ornon (FR); Arnaud Gillet, Langoiran (FR); Matthieu Pedros, Bordeaux (FR)

(73) Assignees: UNIVERSITÉ DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 22 days.

(21) Appl. No.: 15/523,675

(22) PCT Filed: Oct. 30, 2015

(86) PCT No.: PCT/FR2015/052935
§ 371 (c)(1),
(2) Date: May 1, 2017

(87) PCT Pub. No.: WO2016/066975
PCT Pub. Date: May 6, 2016

(65) Prior Publication Data
US 2017/0314165 A1    Nov. 2, 2017

(30) Foreign Application Priority Data
Oct. 31, 2014  (FR) ...................................... 14 60513

(51) Int. Cl.
*D01G 1/04* (2006.01)
*D01G 11/00* (2006.01)
(Continued)

(52) U.S. Cl.
CPC ............... *D01G 11/00* (2013.01); *D01G 5/00* (2013.01)

(58) Field of Classification Search
CPC ... B29B 15/12; B29C 70/54; B32B 2262/106; B32B 5/12; C03B 37/16; C08J 5/24; D04H 1/74
See application file for complete search history.

(56) References Cited

U.S. PATENT DOCUMENTS 3,452,400 A * 7/1969 Kane ......................... D04H 1/74
                                                    19/65 R
3,869,268 A * 3/1975 Briar ........................ C03B 37/16
                                                    65/452

(Continued)

FOREIGN PATENT DOCUMENTS

CN          203846163 U        9/2014
FR          3005065 A1        10/2014
(Continued)

OTHER PUBLICATIONS

International Search Report issued in PCT/EP2016/066975 dated Jan. 21, 2016 (with English translation).
Written Opinion issued in PCT/EP2016/066975 dated Jan. 21, 2016.

*Primary Examiner* — Bobby Muromoto, Jr.
(74) *Attorney, Agent, or Firm* — Kenealy Vaidya LLP

(57) ABSTRACT

Some embodiments are directed to a method and a device that allows fragile fibers, such as carbon fibers, for example, to be recycled so that they can be reused in a new form.

16 Claims, 8 Drawing Sheets

(51) Int. Cl.
*D01G 5/00* (2006.01)
*D01G 1/00* (2006.01)

(56) References Cited

U.S. PATENT DOCUMENTS

| | | | | |
|---|---|---|---|---|
| 4,092,737 A * | 5/1978 | Sandell | ................... | B28B 1/523 366/10 |
| 5,128,198 A * | 7/1992 | Dyksterhouse | ......... | B29C 70/54 156/307.4 |
| 2017/0232704 A1* | 8/2017 | Beraud | ..................... | B32B 5/26 428/76 |

FOREIGN PATENT DOCUMENTS

| JP | S57-39272 A | 3/1982 |
|---|---|---|
| JP | H11-333437 A | 12/1999 |
| JP | 2007015883 A | 1/2007 |

\* cited by examiner

METHOD FOR UNWEAVING AND REALIGNING CARBON FIBERS

CROSS REFERENCE TO RELATED APPLICATION

This application is a National Phase filing under 35 C.F.R. § 371 of and claims priority to PCT Patent Application No.: PCT/FR2015/052935, filed on Oct. 30, 2015, which claims the priority benefit under 35 U.S.C. § 119 of French Application No.: 1460513, filed on Oct. 31, 2014, the contents of which is hereby incorporated in their entireties by reference.

BACKGROUND

Some embodiments relate to a method and a device that allows fragile fibers, such as carbon fibers, for example, to be recycled so that they can be reused in a new form.

Recycling carbon fibers derived from composite materials (separating the fibers from a matrix so that the fibers can be recovered) is of benefit only if the fibers recycled have a length measurable in decimeters and if they are realigned with a greatly aligned so that the recycled fibers can be reused as reinforcement in a new composite material. The composite materials recycled after over 98% of the resin has been eliminated take the form of stacks of carbon fiber fabrics of various shapes and sizes that cannot possibly be used in their present state.

SUMMARY

Some embodiments are directed to the method allowing the fragile fibers (for example carbon fibers) initially crisscrossed or interlaced as woven, to be separated, realigned and brought into the form of continuous strips a few centimeters wide or of continuous yarns. It is then possible to reuse them to create new composite materials either in their present state after coating with resin or after creating semi-finished recycled carbon-fiber products (strips that are pre-impregnated with thermosetting or thermoplastic resin, reconstituted fibers or even rewoven fibers). The method of the invention is intended to re-form semi-long fragile fibers (of a length of between 10 mm and 500 mm) so that they can be reused in a new form or recycled. The reuse or recycling of the fibers requiring re-forming is performed without degradation.

Some other embodiments are therefore particularly well suited to pieces of fabric derived from recycled composites and of arbitrary shapes and sizes that can be circumscribed inside a rectangle measuring 1 meter×20 centimeters. The pieces of fabric can be introduced into the inlet alone or stacked up to 5 pieces thick for example. The pieces of fabric may be introduced into the inlet in any direction whatever. Pieces of braid may also be unwoven provided that they have undergone at least two longitudinal cuts. This method converts pieces of carbon fiber fabric into a continuous strip of realigned carbon fibers with a high degree of realignment, namely a standard deviation on the alignment of the order of 7°, which means that 95% of the fibers lie in a range +/−14°, and which are not mechanically impaired, or into continuous yarns of such fibers. The fiber/matrix separation method that allows the carbon fibers to be recovered is costly whether it is done by thermolysis, solvolysis or molten salt baths, and cannot be financially counterbalanced by the cost of processing this waste. These days, composite materials are still considered to be trivial waste products and the cost of incinerating or burying them is relatively low. Therefore, a method for recycling carbon fibers will be financially counterbalanced only through the sale of semi-finished products produced using the recycled carbon fibers. Now, only a length of the carbon fiber measurable on a decimeter scale allows the mechanical strength of the carbon fibers to be put to use, the use of carbon fibers that are short <10 mm or not aligned not allowing an organic matrix to be strengthened. In consequence, only the production of semi-finished products using fibers of a length >70 mm and correctly aligned will allow the valorization of the recycled carbon fibers on a mechanical standpoint. The invention allows semi-long recycled carbon fibers to be reshaped, thereby allowing their strength to be exploited in future products.

Some other embodiments are directed to the method for unweaving and realigning fibers, notably carbon fibers, from offcuts of fabric having warp and weft yarns is characterized in that it comprises a step of realigning said fibers by successive contacts with at least two walls of a first alignment module and a step of shaping by a second module. The angle of incidence of the fibers at the time of contact allows the fibers to align. The realignment is performed by virtue of a series of deflector plates oriented from 0 to ±90°, preferably from ±10° to ±80° with respect to the vertical. It is also possible to provide a first pair of plates with an angle from 0 to 5°, for example, with respect to the vertical, and a second pair of plates with an angle of 10 to 80°. The fibers align as they drop through the first module striking against the deflectors. The first module is given a vertical vibrational movement at a frequency of between 10 Hz and 200 Hz, such as to impede any immobilization of the fibers between the deflectors. Because the movement is vertically vibrating, this does not cause any misalignment of the fibers. The outlet from the deflector will be dimensioned to suit the target size of the strip of fibers, for example 2.5 cm wide.

Some other embodiments are directed to a second module vibrates with a rotary oscillation. It is thus possible to create a yarn of realigned fibers with a slight intermingling of the fibers allowing for better cohesion.

Some other embodiments are directed to a second module is given a rotary movement.

Some other embodiments are directed to a third arrangement, the second module is given a translational movement. After they have dropped between the deflectors, the fibers end up dropping aligned onto a conveyor belt which then constitutes the second module. The conveyor belt advances to form a strip of realigned fibers.

Advantageously, the method of the invention comprises a step of adding a binder, preferably a thermoplastic or thermosetting polymer binder. The polymer binder makes it possible to ensure the cohesion of the fibers. The binder could for example be a polyamide or an epoxy resin.

According to a first alternative form, the binder is a thermoplastic added at the same time as the fibers that are to be unwoven. The thermoplastic binder is added at the time of unweaving, and this binder is then mixed and mingled with the carbon fibers as they realign. It is positioned over the feed module, next to or possibly over the top of the carbon fabrics.

According to a second alternative form, the binder is added at the outlet from the first alignment module. The binder is a thermoplastic or a thermoset which is added after the first vibrating module of the first alignment module using a hopper arranged over the top of the conveyor belt and which allows the binder to mix with the carbon fibers.

According to one particular arrangement, the binder consists of thermoplastic fibers. The thermoplastic fibers are added during the unweaving, and these fibers are then mixed and mingled with the carbon fibers during the realignment. These fibers may have a length of between 30 mm and 500 mm and may come in any arbitrary form: simple pieces of fabric, mats, or solitary fibers. The thermoplastic fibers are unwoven if necessary and simultaneously realigned with the carbon fibers.

According to another arrangement, the binder consists of thermoplastic or thermosetting powder. Thermoplastic or thermosetting powder is pulverized by addition to the first vibrating module of a set made up of a hopper and of a screen. Vibration of the reservoir causes thermoplastic powder to fall and mix with the carbon fibers positioned in the vibrating module.

Advantageously, the method of the invention comprises a step of activating the polymer binder and of pressing. Activation may be:

a heating in the case of thermoplastics or thermosets,
irradiation in the case of thermosets,
a heating oven,
radiating lamps,
a heating roller,
UV lamps,
integrated heating on the pressing rollers,
or a microwave generator.

Thus it is possible to create preforms with unwoven fibers and polymer binder.

Some other embodiments are directed to a device comprising an unweaving tool comprising two grids, a first grid and a second grid; it is characterized in that it comprises a first alignment module arranged under the two grids and a second module positioned downstream of the first module and in that the first alignment module has at least two deflectors made up of planes that are inclined with respect to the vertical by respective angles α and β such that 90°≤α≤0 and 90°≥β≥0, said alignment module having an opening in the lower part.

The second grid is a support grid, the function of which is to support the fabric offcuts to facilitate the penetration of the teeth of the combs, and the first grid is a stripping grid, which allows the combs to be rid of the fibers. The two grids may or may not be superposed and may be offset, the one upstream of the other. If the grids are superposed, the first grid is situated in the upper part and the second in the lower part below the first grid. In the latter instance, the first grid is situated downstream and the second upstream. The first grid will make it possible to remove the yarns that have remained on the combs at the end of the unweaving.

The first alignment module comprises a realignment tray consisting of a series of deflector plates oriented from 0 to ±90° with respect to the vertical, preferably ±10° to ±80°. The fibers align as they fall through the tray and collide with the deflectors. The tray of the first alignment module is bottomless and surmounts a second module.

According to one particular feature, the second module comprises an inclined tray made of a flexible material having two edges driven in a vertical oscillatory movement creating a rotary movement at the bottom of said tray. The second module is given a rotary oscillating movement obtained by an alternating vertical movement of its edges generating a "rolling" movement in the bottom of the tray. This movement has the effect of causing a slight intermingling of the fibers and of producing a yarn.

Advantageously, the second module comprises a conveyor belt. The conveyor belt is placed under the realignment tray. After they have fallen between the deflectors, the fibers end up falling, aligned, onto the conveyor belt. The conveyor belt advances to form a strip of realigned fibers.

Advantageously, a hopper is positioned over the first alignment module. This hopper is microperforated at its lower end and fixed on the first alignment module. It is filled with thermoplastic polymer powder, such as polyamide powder for example, or with thermosetting powder such as epoxy resin for example, thereby allowing the powder to be added during the realignment so that the strip of carbon fibers which will preferably contain around 0.5 to 5%, preferably around 2% of polymer, can then be heated and compacted.

Advantageously, the second module is followed by a rotary tube. This rigid tube makes it possible to improve the mixing of the fibers through its rotary movement.

According to one particular arrangement, the device of the invention comprises a means of activating a binder positioned downstream of the second module. The fibers constitute strips powdered with thermoplastic or with thermoset, at the exit from the realignment stage, and are activated and compressed and then rolled up inside a non-stick thermoplastic film.

Advantageously, the first grid is produced with parallel rigid rods and the second grid with parallel plates. The second grid is made from parallel plates positioned vertically instead of rods. Thus, this grid is more rigid and can be held at just one end and can therefore be interrupted at the end of the unweaving. The plates are polished in their upper part to allow the carbon fibers to slip during the unweaving.

Advantageously, the parallel plates are curved at their downstream end. This allows anything not unwoven to drop off.

Advantageously, a collecting tray is positioned at the downstream end of the second grid. The collecting tray is added at the level of the curved end of the second grid in order to collect anything not unwoven.

Some other embodiments are directed to a strip of aligned recycled carbon fiber which is characterized in that the length of the recycled carbon fibers is between 20 and 250 mm, preferably between 100 and 250 mm. These lengths are particularly attractive because they are easier to use than the recycled carbon fibers usually obtained.

Advantageously, the strip comprises a polymer binder, such as a thermoplastic or thermosetting polymer binder. Preferably, the strip of fibers according to the invention contains approximately 0.5 to 5% polymer binder, particularly approximately 2%.

Some other embodiments are directed to a continuous yarn of aligned recycled carbon fibers, characterized in that the length of the recycled carbon fibers is between 20 and 250 mm, preferably between 100 and 250 mm. The continuous yarn is made up of recycled carbon fibers grouped together into a fiber yarn. The present day methods do not allow a continuous yarn to be obtained from recycled fibers.

Advantageously, the continuous yarn contains a polymer binder. The carbon fibers are mixed with a polymer binder such as a thermoplastic or thermosetting polymer binder. The polymer binder gives the strips or yarns better integrity. Preferably, the fiber yarn according to the invention contains approximately 0.5 to 5% polymer binder, particularly approximately 2%.

Unless specified otherwise, the percentages in the present invention are percentages by mass.

The term approximately, as used in the present invention, denotes an interval extending by ±10% around the value.

Other advantages still may become apparent to a person skilled in the art from studying the examples hereinbelow, illustrated by the attached figures, given by way of example.

It will be considered that the top is at the top of the figures and that the upstream part is at the inlet to the device and the downstream part at the outlet.

Figure 1:
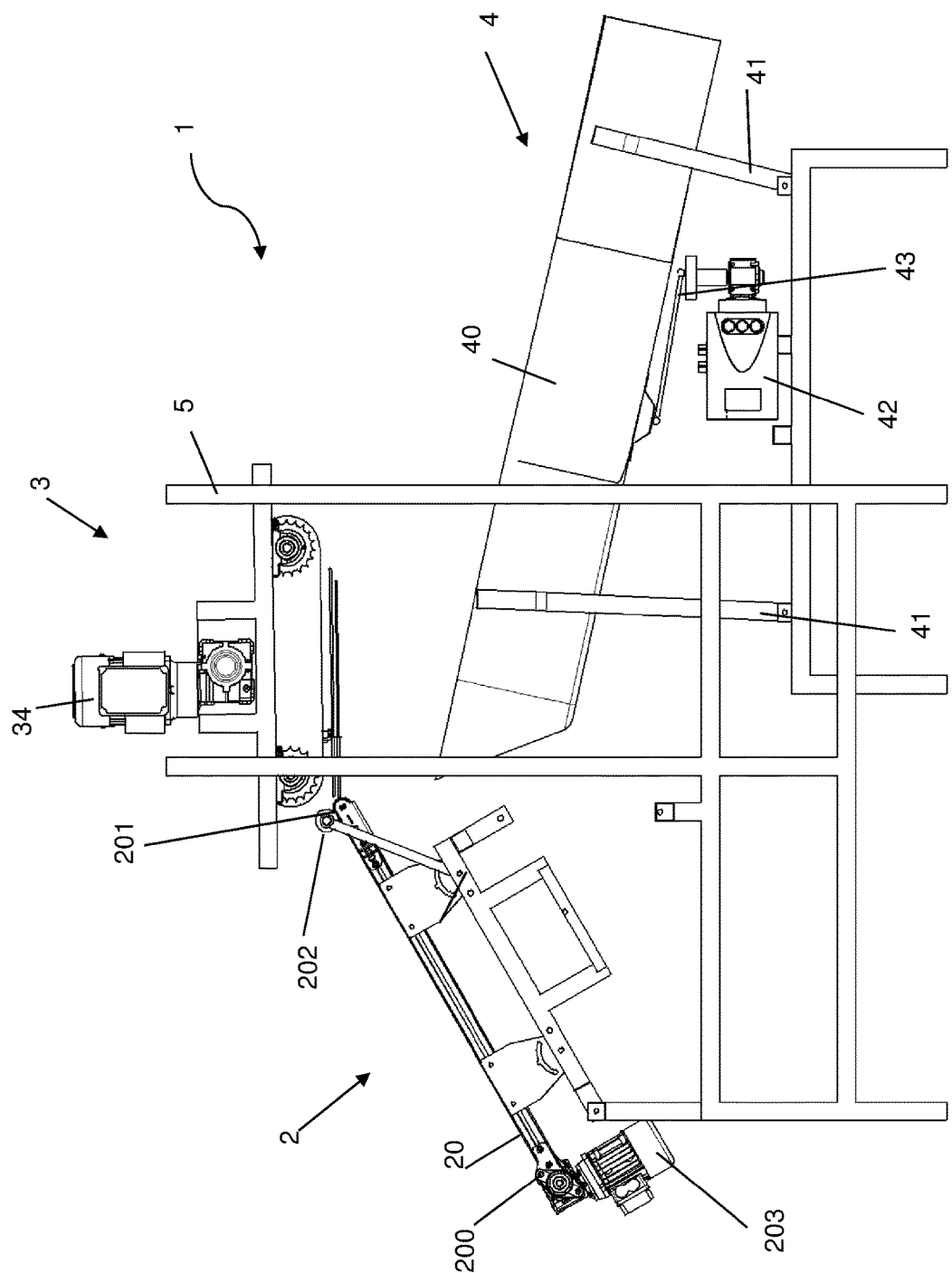
FIG. 1 is an overall and side view of the device according to the invention.

The device 1 illustrated in FIG. 1 includes a feed module 2, an unweaving module 3 and a realignment module or vibrating module 4. The various modules 2, 3 and 4 are arranged on a metallic structure 5.

The feed module 2 includes a sticky belt 20 produced using pins or a rough PVC. Fabric offcuts are introduced at the start 200 of the belt 20. The belt 20 has a certain inclination in order to reduce the footprint of the module and allow feed within reach while at the same time performing the unweaving in the upper part of the unweaving module 3. At the outlet 201 of the belt 20, a press roller 202 applies a certain pressure in order to cause the fabric offcut to adhere as it advances into the unweaving module 3. The belt 20 is driven by an electric motor 203.

The unweaving module 3 includes:
metal combs 30 mounted on a conveyor chain 31 rotating about at least one pulley 310,
two series of parallel lines 320 and 330 arranged underneath the conveyor chain 31 and constituting a first grid 32 and a second grid 33,
an electric motor 34 for driving the conveyor chain 31.

A first alignment module 4 comprises a vibrating system 44 here consisting of an oscillating tray 40 arranged on flexible blades 41, in this example four of these, and an electric motor 42 connected to the chute 40 by a connecting rod-crank system 43 so as to cause said chute 40 to oscillate.

Figure 2:
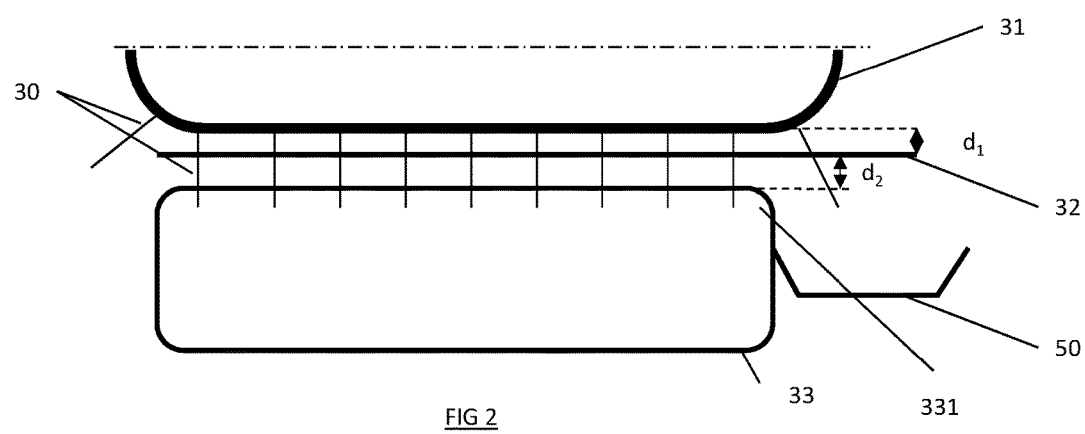
FIGS. 2 and 2a depict detail of the unweaving tool viewed from the side.
Figure 3:
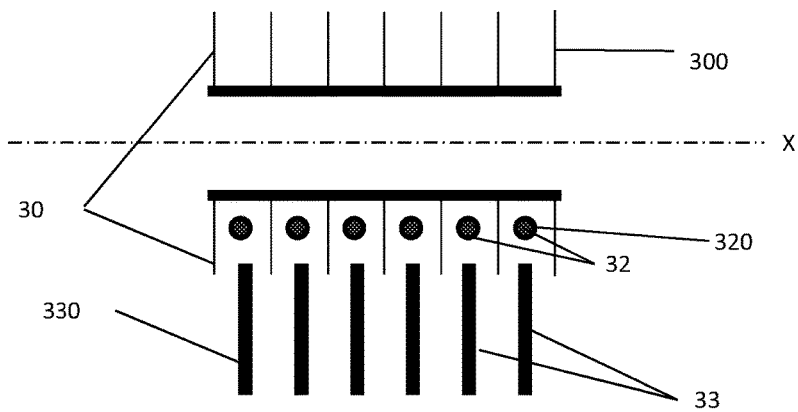
FIG. 3 depicts detail of the unweaving tool viewed in profile.
Figure 2A:
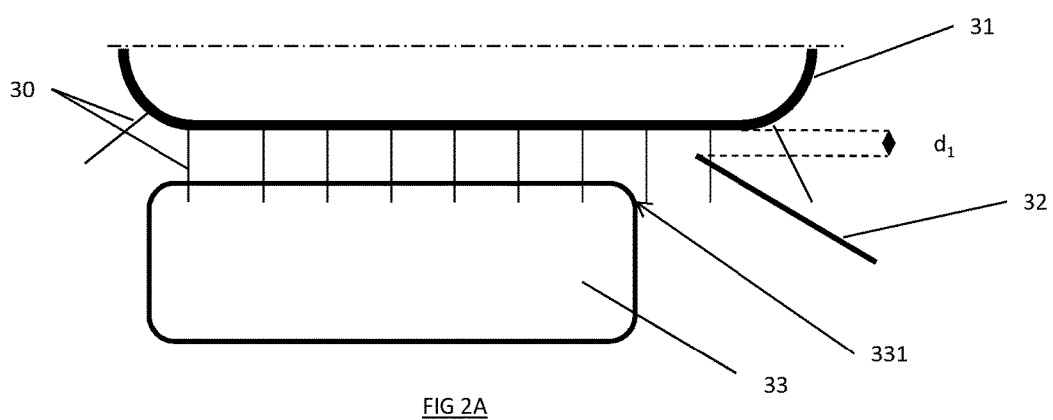

FIGS. 2, 2a and 3 show detail of the combs 30 and of the two grids 32 and 33 of parallel lines 320 and 330. Each comb 30 has several teeth 300. A tray 50 is added at the end of the second grid 33 which has a shape that is curved over at the downstream end 331 to prevent anything that has not been unwoven from combining with the unwoven fibers. In this example, the first unweaving grid 32 is produced using rigid rods 320 of large diameter (4 to 6 mm) so as to have a maximum distance $d_1$ of 2 mm between the combs 30 and the first grid 32 over the entire unweaving length when the grids are superposed (FIG. 2) or over at least part of the unweaving length, preferably at the end of unweaving (FIG. 2a).

The first grid 32 is dense: there is a rod 320 between each pair of teeth 300. The retaining second grid 33 is produced using parallel plates 330 positioned vertically instead of rods as in the first grid 32. Thus, this second grid 33 is more rigid and can be held at just one of its ends, the upstream end, and can be therefore interrupted at the level of the end of the unweaving. The plates 330 are polished or coated with a plastic film on their upper part to allow the carbon fibers to slip during the unweaving. The plates 330 are bent over at their end 331 to allow anything not unwoven to drop off.

Because this second grid 33 is rigid, that makes it possible to limit the clearance between the two superposed grids of FIG. 2 to a distance $d_2$ of 5 mm maximum and to improve the unweaving of tightly woven or stacked fabrics.

Figure 4:
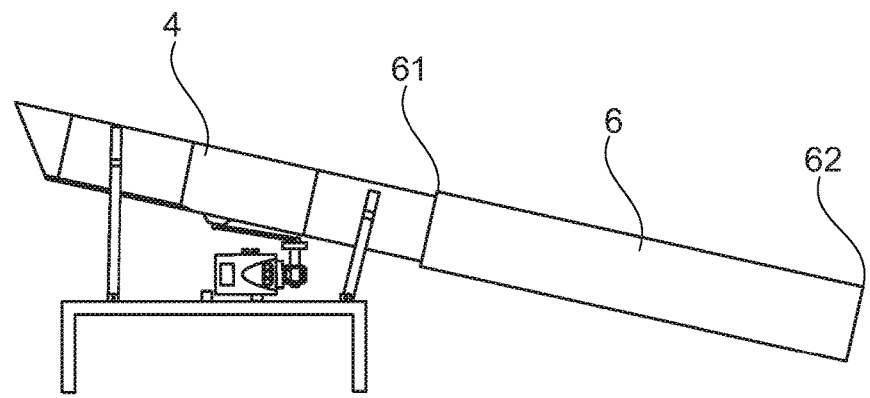
FIG. 4 is a side view of the downstream part of the device according to a first embodiment of the invention.
Figure 5:
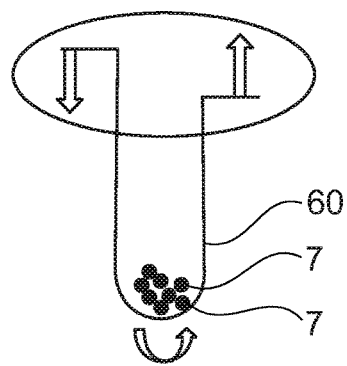
FIG. 5 is a profile view of the second vibrating module.

It may be seen in FIG. 4 that the first module 4 comprises a concave tray 40 with a flat bottom 50 mm (for example) wide making it possible to produce strips of realigned fibers 50 mm (for example) wide. The first module according to the invention is made up of a first module 4 as described in FIGS. 8 and 9. A second module 6 is positioned downstream of the first module 4 and makes it possible to create yarns of realigned fibers, for example 25 mm in diameter, with a slight intermingling of the fibers 7 allowing for better cohesion. The first module 4 has a low frequency horizontal oscillatory movement and is supplemented by the second module 6 which is given a different movement from the first module 4. The second module 6 comprises a concave and flexible realignment tray 60, positioned downstream of the first module 4, in FIG. 4 one end 61 is fixed to the first module 4 and its end 62 is free, in the invention it will be positioned below the opening of the first module 4. Because the tray 60 is flexible, it can be given a different movement from the tray 40. The tray 60 is given an alternating vertical oscillatory movement causing a "rolling" movement in the bottom of the tray. This movement has the effect of causing a slight intermingling of the fibers 7 and of producing a yarn.

Figure 6:
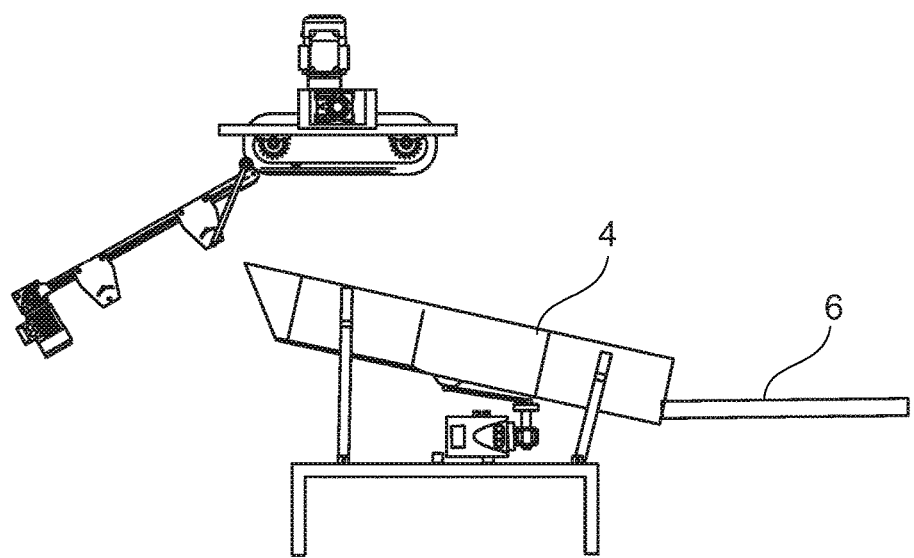
FIG. 6 is a side view of the downstream part of the device according to a second embodiment.
Figure 7:
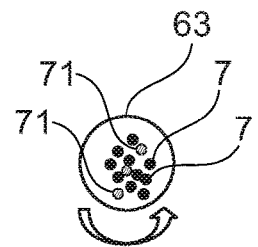
FIG. 7 is a profile view of the second embodiment of the second vibrating module.

FIGS. 6 and 7 show a second embodiment. The second module 6 comprises a rotary tube 63 given a rotary movement.

Figure 8:
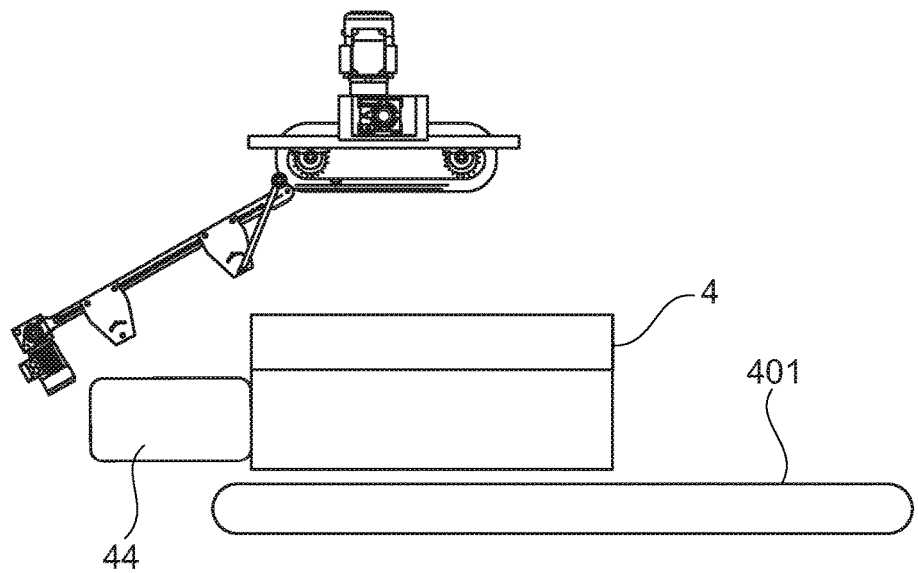
FIG. 8 is a profile view of a third embodiment of the invention.
Figure 9:
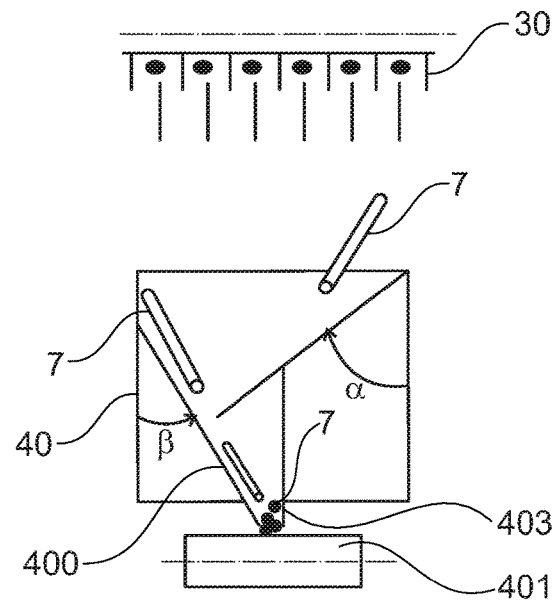
FIG. 9 is a profile view of FIG. 8.

FIGS. 8 and 9 illustrate a third embodiment, the first vibrating module 4 comprises a bottomless tray 40 or a tray with an opening 403 and which is made up of a series of deflector plates 400, the realigned fibers 7 then drop onto a conveyor belt 401 positioned underneath the tray 40. The deflector plates 400 are each oriented at opposite angles α and β from 0 to 90° and preferably of ±10° to ±80° with respect to the vertical. The fibers 7 align as they drop through the tray 40 and collide with the deflectors 400. Because the tray 40 is bottomless, the fibers 7 drop between the deflectors and end up dropping aligned onto the conveyor belt 401. The conveyor belt, as it advances, will form a strip of realigned fibers 7. The tray 40 is given a vertical vibratory movement with a frequency of between 10 Hz and 200 Hz in order to prevent any immobilization of the fibers between the deflectors. Because this movement is vertically vibrating, it does not cause the fibers to misalign.

Figure 10:
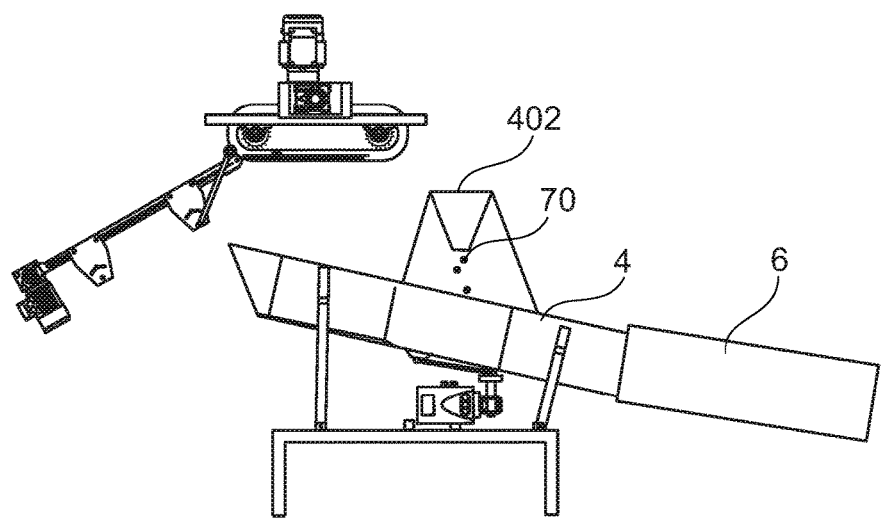
FIG. 10 is a side view of a fourth embodiment of the invention.
Figure 11:
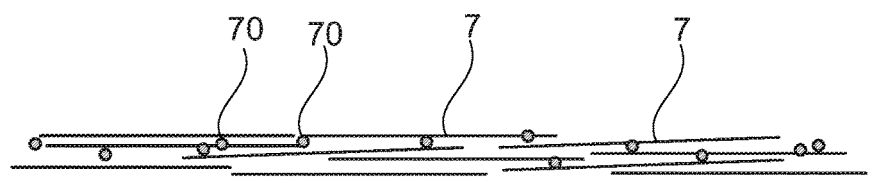
FIG. 11 is a view of the products obtained.

FIG. 10 shows a fourth embodiment in which a microperforated hopper 402 is fixed on the first realignment module 4. This hopper 402 is filled with thermoplastic powder 70, for example with polyamide. The hopper 402 is microperforated at its lower end. The realignment module 4 by vibrating thus causes thermoplastic powder 70 to drop from the microperforated hopper 402 and fall into the realignment tray with the fibers 7. The thermoplastic powder mixes with the carbon fibers during realignment. It is also possible to use a thermoset.

It is also possible to use thermoplastic fibers 71, for example made of polyamide. These are positioned on the feed module 2, next to or possibly on top of the carbon fabrics. These fibers 71 may have a length of between 30 mm and 500 mm and take any arbitrary form (except for a knit) (bits of simple woven fabric, mats, or solitary fibers, etc). The thermoplastic fibers 71 are unwoven and realigned at the same time as the carbon fibers. During the realignment, the first module 4 mingles the carbon fibers 7 with the thermoplastic fibers 71. The second module 6 will preferably comprise a rigid rotary tube 63 rotating about a horizontal axis to improve the mixing of the fibers 7 and 71.

Figure 12:
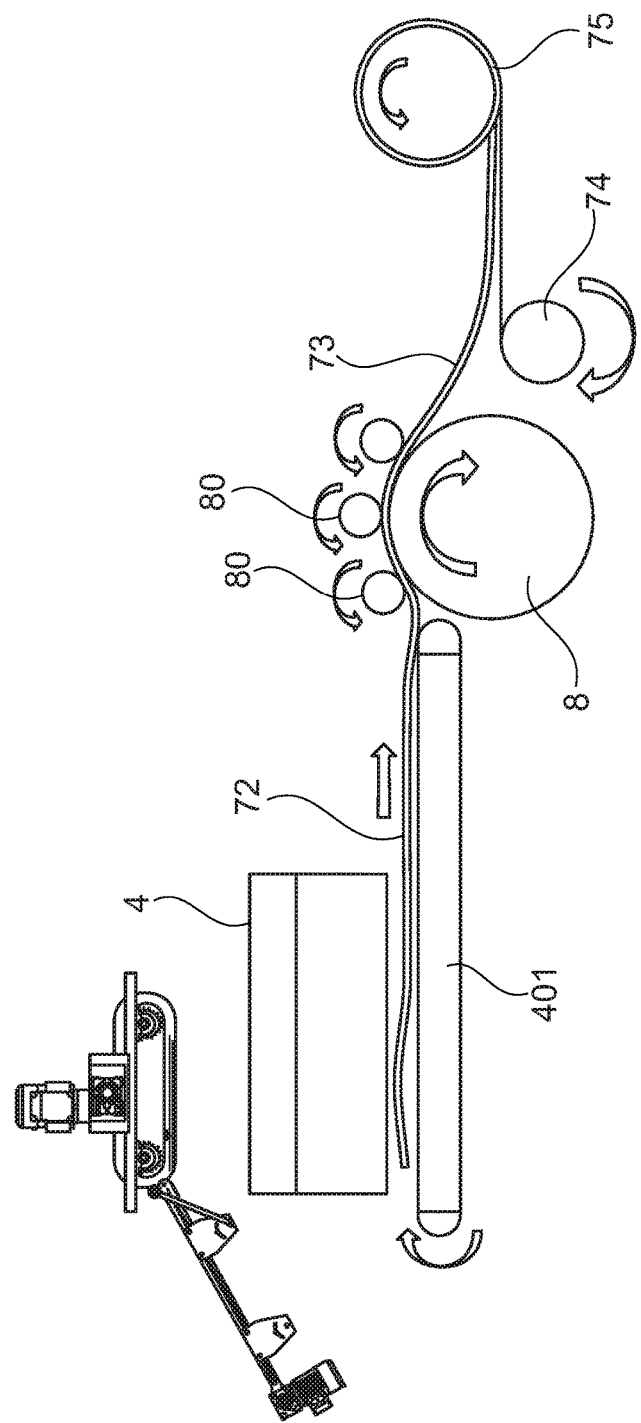
FIG. 12 is a side view of the final part of the device.

FIG. 12 shows the downstream part of the device. The conveyor belt 401 conveys a continuous strip 72 of semi-long carbon fibers 7 containing thermoplastic powder 70 and/or thermoplastic fibers 71. At the end of the conveyor belt 401, the strip 72 of the carbon fibers is deposited onto a rotating roller 8 heated to a temperature above the melting point of the thermoplastic powder 70 or of the thermoplastic fibers 71. Thus, the thermoplastic powder and/or fibers melt. As it turns, the heating roller 8 conveys the strip 72 which is then compressed between press rollers 80 and the heating roller 8, thus causing the molten thermoplastic powder to stick the carbon fibers together: the fibers are consolidated into a consolidated strip 73. The consolidated strip 73 is deposited in a thermoplastic film 74 which advances at the same speed as the conveyor belt 401. The consolidated strip 74 is wound onto a removable roll 75 inside its thermoplastic film 74.

The mode of operation of the device 1 and the corresponding unweaving and alignment method will now be described.

The fabric offcuts used and introduced at the input are variable in nature, in terms of mass per unit area and in terms of weave type. The feed module 2 acts as a buffer and allows the operator to introduce a significant quantity of stacked fabric offcuts, which will then be transferred progressively onto the next modules. It is possible to unweave several offcuts at the same time, particularly if these are thin. The limit is associated with the distance between the grids 32 and 33 and it is necessary for the offcut or offcuts to be able to pass between these two grids 32 and 33.

The unweaving is performed by the combs 30 which are preferably made of metal and mounted on conveyor chains 31, but they could be mounted on any other kind of device providing an oblong movement, other than a conveyor-type belt, drive belts, cables, etc. The rotation speed of the motor 34 is chosen so that the linear speed of the combs 30 is 10 times higher than the speed of the belt 20. The teeth 300 penetrate the fabric offcut and carry with them a fraction of its weft. The offcut is held on the series of parallel lines 33 that form a grid, in order to ensure that the teeth 300 penetrate the weft. When the teeth 300 are engaged in an offcut, they pull on the fabric and this is compensated for by the press roller 201 which presses the offcut firmly against the belt 20. This system is highly effective even when the area of fabric gripped by the press roller 201 is small. Anything not unwoven is collected in the tray 50 to prevent it from dropping into the alignment tray and is then reintroduced at the inlet of the machine.

Once the fibers have been unwoven, they drop under gravity into the tray 40 mounted on the flexible blades 41 which thus act as springs. The oscillation is a reciprocating movement of defined amplitude and defined frequency which cause the fibers to self orientate rapidly through successive impacts of said fibers against the walls of the deflectors 400. The movement is obtained using a vibrating system 44 consisting for example of an electric motor 42 and of a connecting rod-crank system 43. A speed variator allows the frequency of the oscillations to be adjusted. The oscillatory movement and the inclination of the chute 40 allow the fibers to align, and form a strip. The second tray 60 makes it possible to achieve a yarn of realigned fibers with a slight intermingling of the fibers 7 to allow greater cohesion.

In the third embodiment, the realignment system allows automatic and continuous recovery of the strips of fibers. Continuous recovery of the strips will also make it possible to avoid misalignment during manual collection of the fibers.

In order to improve the integrity of the fibers 7, a polymer binder, for example a thermoplastic polymer binder, is added and makes it possible to create a strip of carbon fibers that is consolidated after it has been melted and then solidified. Thus, the strips powdered with polymer binder and leaving the realignment stage are heated and compressed and then rolled up inside a nonstick thermoplastic film.

The strip of recycled carbon fibers is conveyed, consolidated and wound up. Thus, the strip of semicontinuous carbon fibers or the continuous yarn becomes a continuous semi-finished product in the form of a roll, that can be used directly in industries that employ composite material to cut to suit and position in the bottom of a mold before impregnating with resin.

To sum up, the device according to the invention is made up of a first alignment module 4 which is made up of a bottomless tray with deflectors followed by a second alignment module into which the fibers fall. This second alignment module is made up either of a horizontally oscillating rigid tray with a flexible tray with rolling movement and possibly followed by a rotary tube for the production of a yarn, or of a conveyor belt which optionally comprises a system for activating the binder in order to produce flat strips, which may optionally be consolidated.

The invention claimed is:

1. A method for unweaving and realigning carbon fibers, from offcuts of fabric having warp and weft yarns, the method comprising:
   unweaving the fibers using combs including teeth;
   realigning the fibers by successive contacts with at least two walls of a first alignment module, that includes at least two deflectors made up of planes that are inclined with respect to the vertical by a respective angle $\alpha$ and $\beta$ such that $90°\leq\alpha\leq0$ and $90°\geq\beta\geq0$, the alignment module having an opening in the lower part; and
   shaping by a second module.

2. The method as claimed in claim 1, wherein the second module is given a translational movement.

3. The method as claimed in claim 1, further including adding a thermoplastic.

4. The method as claimed in claim 1, wherein the binder is a thermoplastic added at the same time as the fibers that are to be unwoven.

5. The method as claimed in claim 3, wherein the binder is added at the outlet from the first alignment module.

6. The method as claimed in claim 4, wherein the binder consists of thermoplastic fibers.

7. The method as claimed in claim 5, wherein the binder consists of thermoplastic powder.

8. The method as claimed in claim 5, wherein the binder is added at the inlet of the first alignment module.

9. The method as claimed in claim 3, further including activating the polymer binder and of pressing.

10. A device, comprising:
   an unweaving tool that includes two grids, the two grids including a first grid, and a second grid;
   a first alignment module arranged under the two grids; and a second module positioned downstream of the first module;
wherein the first alignment module has at least two deflectors made up of planes that are inclined with respect to the vertical by a respective angle $\alpha$ and $\beta$ such that $90°\leq\alpha\leq 0$ and $90°\geq\beta\geq\beta 0$, the alignment module having an opening in the lower part.

11. The device as claimed in claim 10, wherein the second module includes an inclined tray made of a flexible material having two edges driven in a vertical oscillatory movement creating a rotary movement at the bottom of the tray.

12. The device as claimed in claim 10, wherein the second module includes a conveyor belt.

13. The device as claimed in claim 10, wherein the second module is followed by a rotary tube.

14. The device as claimed in claim 10, further including an activator for activating a binder positioned downstream of the second module.

15. The device as claimed in claim 10, wherein the first grid is produced with parallel rigid rods, and the second grid with parallel plates.

16. The method as claimed in claim 1, further including adding a thermosetting polymer binder.

* * * * *